United States Patent
Kidron et al.

(10) Patent No.: US 10,824,789 B2
(45) Date of Patent: Nov. 3, 2020

(54) MANAGING A PRESENTATION

(71) Applicant: HEWLETT-PACKARD DEVELOPMENT COMPANY, L.P., Houston, TX (US)

(72) Inventors: Adi Kidron, Tel Aviv (IL); Adam Lahav, Nes Ziona (IL); Eli Mordechai, Yehud (IL); Amit Erental, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 901 days.

(21) Appl. No.: 14/787,477

(22) PCT Filed: Aug. 28, 2013

(86) PCT No.: PCT/US2013/057002
§ 371 (c)(1),
(2) Date: Oct. 28, 2015

(87) PCT Pub. No.: WO2015/030745
PCT Pub. Date: Mar. 5, 2015

(65) Prior Publication Data
US 2016/0070678 A1    Mar. 10, 2016

(51) Int. Cl.
| G09B 5/06 | (2006.01) |
| G06F 3/0484 | (2013.01) |
| G06F 40/117 | (2020.01) |
| G09B 7/04 | (2006.01) |
| G06F 40/169 | (2020.01) |

(52) U.S. Cl.
CPC ........ *G06F 40/117* (2020.01); *G06F 3/04845* (2013.01); *G06F 40/169* (2020.01); *G09B 5/06* (2013.01); *G09B 7/04* (2013.01)

(58) Field of Classification Search
CPC .. G06F 17/218; G06F 17/241; G06F 3/04845; G06F 40/117; G06F 40/169; G09B 5/06; G09B 7/04
See application file for complete search history.

(56) References Cited

U.S. PATENT DOCUMENTS

| 7,103,315 B2 | 9/2006 | Wiklinson |
| 8,108,777 B2 | 1/2012 | Penner et al. |
| 10,013,890 B2 * | 7/2018 | Allen ............... G06F 40/30 |

(Continued)

FOREIGN PATENT DOCUMENTS

| CN | 101523392 | 9/2009 |
| WO | WO-2013/002920 | 1/2013 |

OTHER PUBLICATIONS

Davison, P. Electric Slide Makes Presenting Easy, Nov. 2, 2012, 3 pages http://www.insidemobileapps.com/2012/11/02/electric-slide-makes-presenting-easy/.

(Continued)

*Primary Examiner* — Andrew T Chiusano

(57) ABSTRACT

Managing a presentation includes identifying audience member interactions with a plurality of presentation pages. Each of the plurality of presentation pages is associated with data indicative of the audience member interactions. That data is processed to identify an action plan specifying an update to the presentation. That update is based on identified audience member interactions with at least one of the plurality of presentation pages. The action plan is implemented to update the presentation.

20 Claims, 4 Drawing Sheets

(56) References Cited

U.S. PATENT DOCUMENTS

| | | | |
|---|---|---|---|
| 2003/0208613 A1 | 11/2003 | Signes et al. | |
| 2006/0075348 A1 | 4/2006 | Xu et al. | |
| 2007/0100938 A1* | 5/2007 | Bagley | G06Q 10/10 709/204 |
| 2007/0282948 A1* | 12/2007 | Praino | G06Q 10/10 709/204 |
| 2008/0092050 A1 | 4/2008 | Wu et al. | |
| 2010/0114985 A1* | 5/2010 | Chaudhary | G06F 16/41 707/803 |
| 2011/0126130 A1 | 3/2011 | Lieb et al. | |
| 2011/0271207 A1* | 11/2011 | Jones | H04W 4/21 715/753 |
| 2011/0295392 A1* | 12/2011 | Cunnington | G06Q 10/10 700/90 |
| 2011/0307788 A1* | 12/2011 | Cheung | G06Q 10/10 715/731 |
| 2013/0007103 A1 | 1/2013 | Braun et al. | |
| 2013/0073965 A1 | 3/2013 | Sik et al. | |
| 2013/0132848 A1 | 5/2013 | Bhatt | |
| 2013/0169670 A1* | 7/2013 | Guo | H04L 63/10 345/619 |
| 2014/0165087 A1* | 6/2014 | Smith | H04N 21/4758 725/24 |
| 2014/0282013 A1* | 9/2014 | Amijee | G06F 3/0482 715/732 |
| 2015/0052440 A1* | 2/2015 | Livingston | G06F 3/04845 715/732 |
| 2015/0193089 A1* | 7/2015 | Berlin | G06Q 10/10 715/731 |
| 2017/0169727 A1* | 6/2017 | Briggs | G09B 19/04 |
| 2018/0122371 A1* | 5/2018 | Vangala | G06F 40/295 |

OTHER PUBLICATIONS

International Search Report and Written Opinion, dated May 29, 2014, PCT Patent Application No. PCT/US2013/057002, 11 pages.

\* cited by examiner

MANAGING A PRESENTATION

CROSS-REFERENCE TO RELATED APPLICATION

This application is a U.S. National Stage Application of and claims priority to International Patent Application No. PCT/US2013/057002, filed on Aug. 28, 2013, and entitled "MANAGING A PRESENTATION".

BACKGROUND

In business and educational environments, information is often delivered to audiences though slide presentations. A presenter may share her slides with audience members and may receive feedback generated though post presentation surveys.

DRAWINGS

DETAILED DESCRIPTION

Introduction

Figure 1:
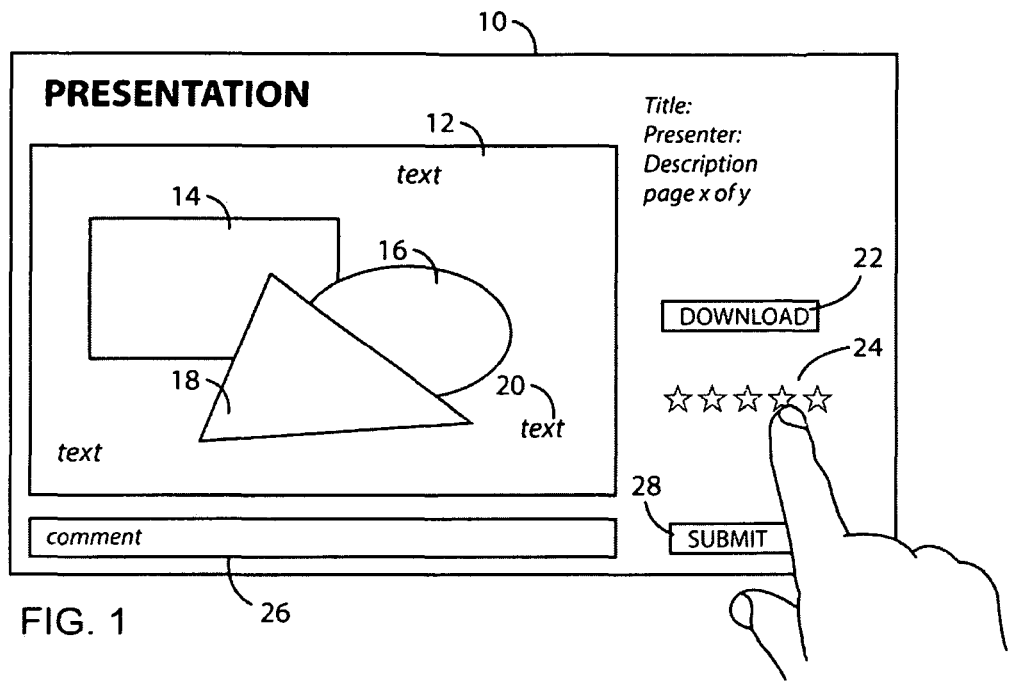
FIGS. 1 and 2 are example screen views of a slide sharing application through which an audience member can interact with a presentation page.

In business, educational and other environments, information is delivered to audiences though slide presentations. A presenter may share her slides with audience members and may receive feedback generated though post-presentation surveys. Sharing an entire slide deck can be helpful, but often an audience member is only interested in a subset of the slides. Moreover, when sharing an entire slide deck, the presenter does not receive implicit feedback as to which slides the audience member was most interested. While post-presentation surveys are useful, they do not allow for real time feedback nor do they provide the audience members an efficient mechanism for commenting on or otherwise expressing a question that focusses on an individual slide. Moreover, neither slide deck sharing nor post-presentation surveys provide a real or near real time indication of audience attention levels with respect to any given slide.

Embodiments described below operate to identify audience member interactions with each of a plurality of presentation pages for a specified presentation. A presentation page, as used herein, is an electronic page such as a slide or other document page by which information is conveyed. A presentation can include any number of presentation pages. Interactions with a given presentation page can include download requests, comments, reviews, and any other interaction in which an audience member through an input device provides an indication that the audience member is actively viewing the presentation page.

Each of the presentation pages is associated with metadata indicative of audience member interactions with that page. That metadata can identify each interaction and information about the audience member responsible for the interaction. Such audience member information can include a name, role, and location.

The metadata is processed to identify an action plan specifying an update to the specified presentation. That update is thus based on identified audience member interactions with at least one of the plurality of presentation pages. An update may correspond to the inclusion or exclusion of a presentation page, the ordering of a sequence of presentation pages or a selection of a set of speaker notes for use in delivering the presentation. An update may be identified in real time while the presentation is in progress. In such cases, the update may be an alert for the presenter that there is a shared question with respect to a given presentation page, positive or negative reviews of a presentation page, or a shared lack of audience engagement with respect to a presentation page.

The action plan is then implemented. Implementing can include providing suggestions to the presenter on presentation pages to include or exclude, a presentation page ordering, and a specified set of speaker notes. Implementing can also include updating the presentation as would otherwise be suggested.

The following description is broken into sections. The first, labeled "Illustrative Examples," presents example screen views of a user interface for presentation application through which an audience member can interact with presentation pages. The second section, labeled "Components," describes examples of various physical and logical components for implementing various embodiments. The third section, labeled "Operation," describes steps taken to implement various embodiments.

Illustrative Example

Figure 2:
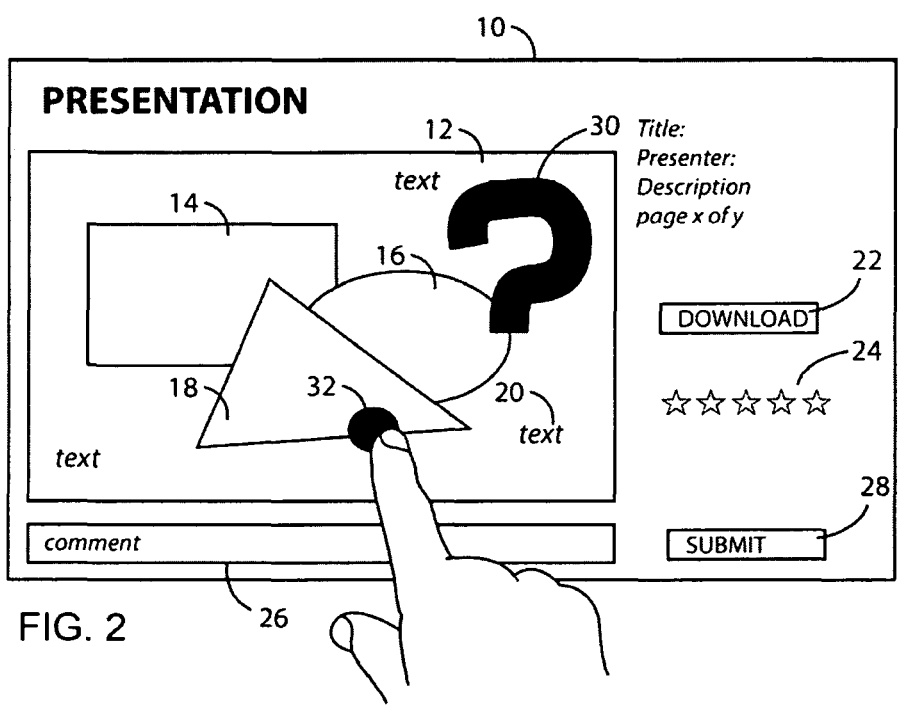

FIGS. 1 and 2 depict a screen view 10 of a presentation application. In this example, screen view 10 is being displayed by a computing device of an audience member. Starting with FIG. 1, screen view 10 includes page view 12, page content 14-20, and interaction controls 22-28. Page view 12 represents a panel in which a presentation page can be displayed. As the presenter progresses, page view 12 updates to reflect the current presentation page. Page content 14-20 represents the content of a particular presentation page. Interaction controls 22-28 are user accessible controls through which the device user can interact with the presentation page being displayed. In this example, control 22 allows the user request a download of the currently displayed presentation page. Control 24 allows the user to rate that presentation page while controls 26 and 28 allow the user to comment on the page.

Moving to FIG. 2, page view 12 may also serve as an interaction control. In this example, the user has swiped the hook pattern 30 of a question mark in page view 12 and placed the question mark's dot 34 over page content 14. Such interaction may reflect that the user has a question with respect to page content 14. Other interactions may include selecting page content 14, 16, 18 or 20. The user interactions with page view 12 and controls 22-28 can be recorded and represented as metadata associated with the corresponding presentation page.

As metadata is collected from enough audience members, that metadata becomes useful for updating the corresponding presentation in a meaningful way. For example, a lack of interaction with a presentation page may reflect a lack of attention from the audience. Requests to download a presentation page can may reflect audience interest. The metadata may be used in real time to alert the presenter that the presentation is going well, that the audience has a shared question, or that the audience is losing interest. The metadata may be used to automatically build a subsequent presentation. For example, the presenter may have a future presentation for an audience of members sharing a particular role or located in a certain geography. The metadata may be used to identify and include or recommend presentation pages liked or otherwise well received by past audience members sharing that role or location.

Components

Figure 3:
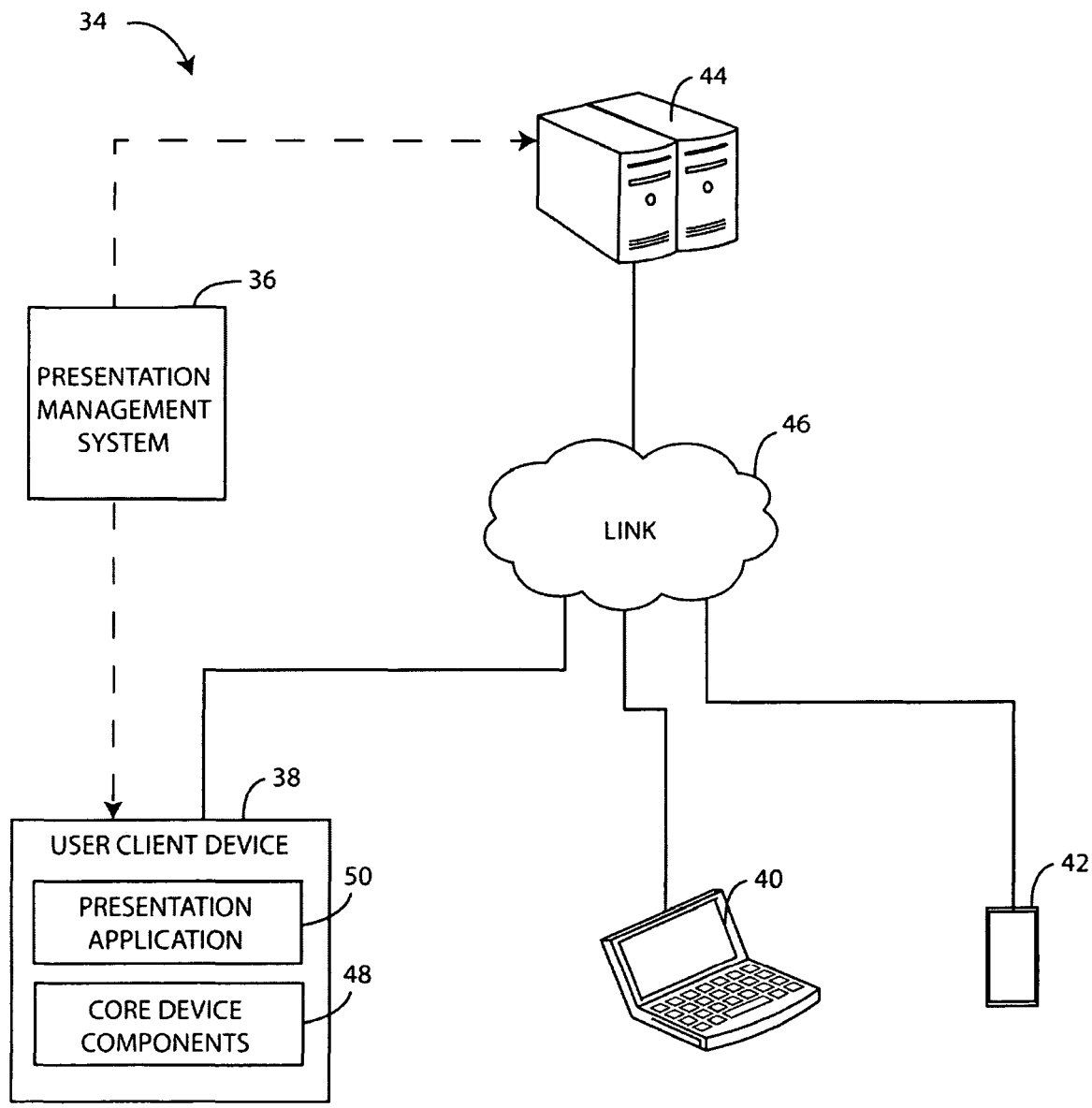
FIG. 3 is a block diagram depicting an example environment in which various embodiments may be implemented.

FIG. 3 depicts an example environment 34 in which embodiments may be implemented as presentation management system 36. Environment 34 is shown to include client devices 38, 40 and 42 and server device 44. Components 38-44 are interconnected via link 46. Link 46 represents generally any infrastructure or combination of infrastructures configured to enable electronic communication between components 38-44. For example, link 46 may represent the internet, one or more intranets, and any intermediate routers, switches, and other interfaces. Client devices 38-42 represent generally any computing device with which a user may interact to communicate with other client devices and server device 46 via link 46. Server device 44 represents generally any computing device configured to serve an application and corresponding data for consumption by client devices 38-46.

Client device 38 is shown to include core device components 48 and presentation application 50. Core device components 48 represent generally the hardware and programming for providing the computing functions for which device 38 is designed. Such hardware can include a processor and memory, touch display and any other user input features. The programming can include an operating system and applications. Presentation application 50 represents an application configured to cause client device 38 to display a presentation as it is being given. In other words, presentation application 50 synchronizes its display with the current presentation page being delivered by the presenter. Screen view 10 of FIGS. 1 and 2 are examples of a display produced by presentation application 50. Thus, through presentation application 50, an audience member can interact with each presentation page. It is noted that presentation application 50 may be implemented using a browser or it may be a separate application. While not shown, client devices 40 and 42 also include their own versions of core device components 48 and presentation application 50.

Presentation management system 36, discussed in more detail below, represents generally a combination of hardware and programming configured to identify audience member interactions with each of a plurality of presentations pages and, based on those interactions, update a presentation. As mentioned above, such an update may include altering the presentation content or suggesting a modification to the presenter. System 36 may be wholly integrated within core device components 48. System 36 may be implemented was a component of server device 44 where it takes action based in part on communications received from client devices 38 via link 46. System 36 may be distributed across server device 44 and client devices 38-42.

Figure 4:
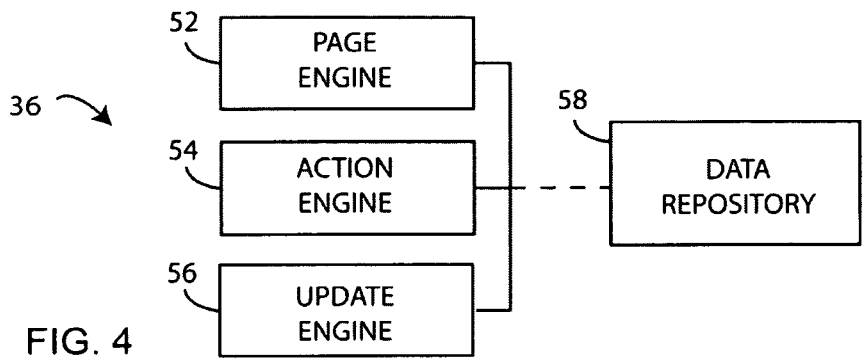
FIG. 4 is a block diagram depicting an example of a system for managing a presentation.
Figure 5:
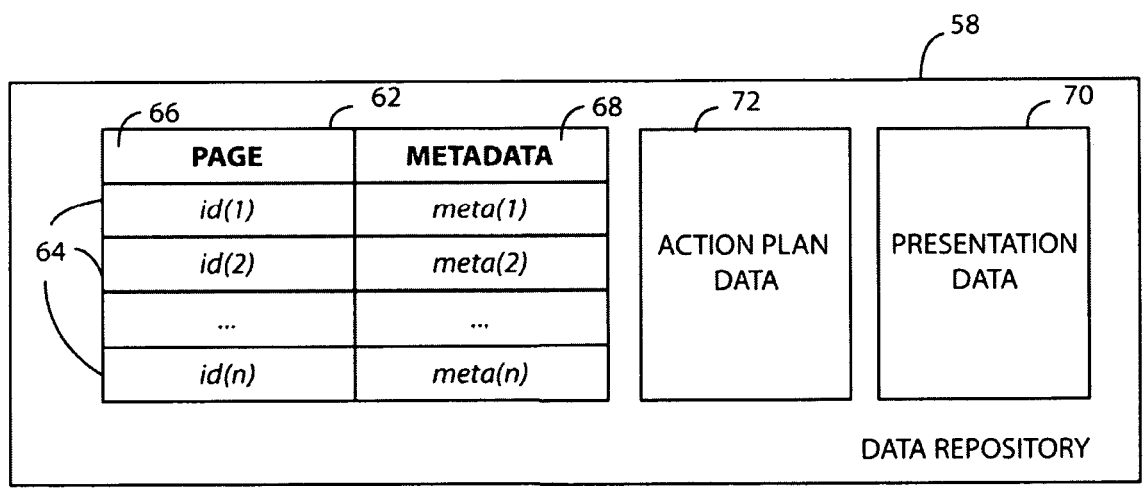
FIG. 5 is a block diagram depicting an example data structure for associating metadata with presentation pages.
Figure 6:
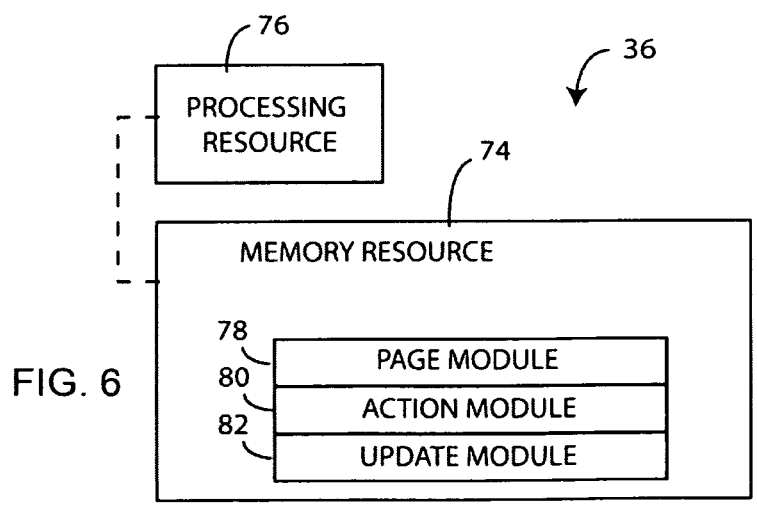
FIG. 6 is a block diagram depicting a memory resource and a processing resource according to an example.

FIGS. 4-6 depict examples of physical and logical components for implementing various embodiments. In FIG. 4 various components are identified as engines 52-56. In describing engines 52-56, focus is on each engine's designated function. However, the term engine, as used herein, refers to a combination of hardware and programming configured to perform a designated function. As is illustrated later with respect to FIG. 6, the hardware of each engine, for example, may include one or both of a processor and a memory device, while the programming is code stored on that memory device and executable by the processor to perform the designated function.

FIG. 4 is a block diagram depicting components of presentation management system 36. In this example, system 36 includes page engine 52, action engine 54, and update engine 56. In performing their respective functions, engines 52-56 may access data repository 58. Repository 58 represents generally any memory accessible to system 36 that can be used to store and retrieve data.

Page engine 52 is configured to maintain metadata indicative of audience member interactions with each of a plurality of presentation pages. Referring to FIGS. 1-3 as an example, page engine 52 may receive an indication that a user has, using presentation application 50, interacted with a specified presentation page. As explained, the interaction can take one of many forms such as requesting a download, rating, commenting and other interactions instigated by users through client devices 38-42. As explained below with respect to FIG. 5, page engine 52 may utilize data repository 58 to maintain the metadata.

The metadata for each presentation page can identify specific interactions and counts of interactions of varying types. The metadata can also identify characteristics of each audience member interacting with a given presentation page as well as the nature of that interaction. Such characteristics can include audience member role and location. Thus, the metadata may reflect that audience members of a specified role or location have requested to download a particular presentation page a specified number of times.

Action engine 54 is configured to identify an action plan based on the metadata. Update engine 56 is configured to implement an action plan to update a presentation with respect to at least one of the plurality of presentation pages. That action plan is electronic data that specifies an update to be implemented or otherwise applied to a presentation. Again the update may be a suggestion to modify the presentation or an actual modification of the presentation. The action plan can specify a modification of a specific presentation page or set of presentation pages. The action plan may specify presentation pages to include and exclude, a particular set of speaker notes, presentation page sequences and timings, and the like.

In one example, action engine 54 may be aware of an upcoming presentation to a specified audience whose members share a primary role or are primarily collocated. The term primary or primarily is used herein to mean a majority or most. Action engine 54 may then process the metadata to identify those of the presentation pages that have been well received in past presentations by audience members sharing the same role or location. The corresponding action plan might then specify the inclusion of such presentation pages with some guidance for the presenter to focus on presentation pages where there has been past questions of interest. Stated another way, action engine 54 may identify a first presentation page that has been interacted with more than a second. The identified action plan then specifies an update that will increase focus on the first presentation page over the second.

In another example, action engine 54 may process the metadata in real time or near real time to identify audience member interactions that are indicative of audience engagement with a current presentation. Such interactions can include requests to download selected presentation pages, ratings and comments, and any other interaction with a presentation page being displayed by an audience member's client device. In this scenario, a lack of any interaction may be indicative of poor audience engagement. Requests to download and positive reviews, comments, and questions may be indicative of positive audience engagement.

As the occurrence rate of such interactions increases or decreases during a presentation, the level of audience engagement may be presumed to be also be increasing or decreasing. Action engine 54 can then identify an action plan that specifies an update to the current presentation. That update may be designed to alert the presenter of the engagement level. The update may also include modifications or recommended modifications directed to a specific presentation page or set of pages. For example, the metadata being maintained by page engine 52 may be indicative of a shared question or other focus on a specific presentation page. Processing that metadata, action engine 54 can recognize that audience focus and identify an action plan specifying an update that when implemented by update engine 56 will alert the presenter accordingly.

FIG. 5 depicts an example implementation of data repository 58. In this example, repository 58 includes table 62 for use by page engine 52 to maintain metadata. Table 62 includes a number of entries 64 each populated with data in a page field 66 and metadata field 68. Data in page field 66 identifies a given presentation page. Table 62 may be unique to a given presentation, or it may identify presentation pages from a collection of different presentations. In the latter case, data in page field 66 may also identify one or more presentations that the given presentation page is used.

Data in metadata field 68 represents metadata associated with a corresponding presentation page. As explained, the metadata is indicative of audience member interactions with the given presentation page. The metadata may identify specific interactions, a count or other metric of interactions of specified types, and characteristics of the audience members who interacted with the presentation page. The count, for example may correspond to the number of download requests for the presentation page. Another metric may be an average rating for that presentation page. The characteristics may identify specific audience members, member roles, and member locations for those who have interacted with a given presentation page.

Data repository 70 is also shown to include presentation data 70 and action plan data 72. Presentation data 70 represents a library of one or more presentations. The presentations may be word processing documents, slide shows, and any other electronic file that can include one or more presentation pages. Action plan data 72 represents a library of one or more action plans. In the example of FIG. 4, page engine 52 is responsible for maintaining table 52, action engine 54 is responsible for maintaining action plan data 72, and update engine 56 is responsible for accessing and implementing a specified action plan from action plan data 72. In doing so, the specified action plan may specify an update for modifying a particular presentation. In such a case, update engine 56 may access that presentation from presentation data 70 and modify the presentation as specified.

In foregoing discussion, engines 52-56 were described as combinations of hardware and programming. Engines 52-56 may be implemented in a number of fashions. Looking at FIG. 6, the programming may be processor executable instructions stored on tangible memory resource 74 and the hardware may include processing resource 76 for executing those instructions. Thus memory resource 74 can be said to store program instructions that when executed by processing resource 76 implements system 36 of FIG. 4.

Memory resource 74 represents generally any number of memory components capable of storing instructions that can be executed by processing resource 76. Memory resource 74 is non-transitory in the sense that it does not encompass a transitory signal but instead is made up of more or more memory components configured to store the relevant instructions. Memory resource 74 may be implemented in a single device or distributed across devices. Likewise, processing resource 76 represents any number of processors capable of executing instructions stored by memory resource 74. Processing resource 76 may be integrated in a single device or distributed across devices. Further, memory resource 74 may be fully or partially integrated in the same device as processing resource 76, or it may be separate but accessible to that device and processing resource 76.

In one example, the program instructions can be part of an installation package that when installed can be executed by processing resource 76 to implement system 36. In this case, memory resource 74 may be a portable medium such as a CD, DVD, or flash drive or a memory maintained by a server from which the installation package can be downloaded and installed. In another example, the program instructions may be part of an application or applications already installed. Here, memory resource 74 can include integrated memory such as a hard drive, solid state drive, or the like.

In FIG. 6, the executable program instructions stored in memory resource 74 are depicted as page module 78, action module 80, and update module 82. Page module 78 represents program instructions that when executed cause processing resource 76 to implement page engine 52 of FIG. 4. Action module 80 represents program instructions that when executed cause the implementation of action engine 54. Likewise, update module 82 represents program instructions that when executed cause the implementation of update engine 56.

Operation

Figure 7:
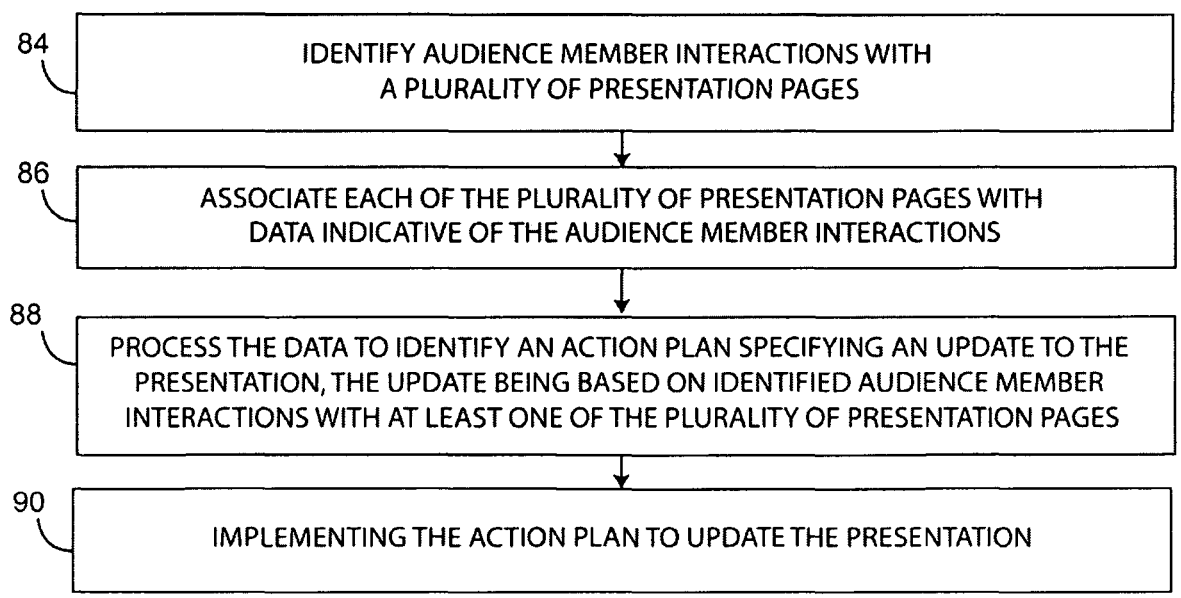
FIG. 7 is a flow diagram depicting steps taken to implement an example.

FIG. 7 is a flow diagram of steps taken to implement a method for managing a presentation and in particular managing a presentation based on audience member interactions with presentation pages. In discussing FIG. 6, reference may be made to the screen views of FIGS. 1 and 2 and the components depicted in FIGS. 3-6. Such reference is made to provide contextual examples and not to limit the manner in which the method depicted by FIG. 7 may be implemented.

Audience member interactions with a plurality of presentation pages are identified (step 84). Page engine 52 of FIG. 4 may be responsible for implementing step 84. In one example, an audience member utilizing a client device 38 of FIG. 3 is being shown presentation pages such as depicted by the screen views 10 of FIGS. 1 and 2. The interactions identified in step 84 can include an interaction of an audience member with screen view 10. In the example of FIGS. 1 and 2, interactions can include download requests, ratings, comments, questions and the like. The user interactions are then communicated to page engine 52 directly or indirectly.

Each of the plurality of presentation pages is associated with data indicative of the audience member interactions identified in step 84 (step 86). Again, page engine 52 of FIG. 4 may be responsible for implementing step 86. In doing so, page engine 52 may create or update table 62 of FIG. 5. That data is processed to identify an action plan specifying an update to the presentation (step 88). The update is based audience member interactions (identified in step 84) with at least one of the plurality of presentation pages (as associated in step 86). Referring to FIG. 4, action module may be responsible for implementing step 88.

The identified action plan is then implemented to update the presentation (step 90). Referring to FIG. 4, update engine 56 may be responsible for implementing step 90. The update in step 90 may be a suggestion communicated to the presenter to implement a modification. The update can also include automatically modifying the presentation with or without presenter approval.

Identifying in step 84, in an example, includes identifying audience member interactions that are download requests for a specified ones of the plurality of presentation pages. Processing in step 88 can then include processing the data of step 86 to identify a specified one of the plurality of presentation pages that has been requested more than others of the plurality of presentation pages. The identified action plan can then specify an update to the presentation that will increase focus on the specified one of the plurality of presentation pages.

Associating in step 86 can include, for each of the plurality of presentation pages, associating that presentation page with data indicative of a characteristic of each audience member that interacted with that presentation page. Processing in step 88 can then include processing the data to identify a specified one of the plurality of presentation pages that is preferred by audience members sharing a given characteristic. The identified action plan specifies an update based on the identified preference. Updating in step 90 then includes implementing the action plan to update the presentation when the presentation is to be directed to an audience of members primarily sharing the given characteristic. Again, primarily in this case means that most of the audience members share the given characteristic.

Identifying in step 84 can include identifying user interactions indicative of audience engagement with a current presentation. Associating in step 86 can then include, during the current presentation, associating a corresponding one of the plurality of presentation pages with data indicative of audience engagement. Step 88 then includes processing the data to identify a level of audience engagement during the current presentation to identify, based on the level of engagement, an action plan that specifies an update to the current presentation based on the identified engagement level. The level of audience engagement may be indicative of a shared audience member question with respect to a given one of the plurality of presentation pages. The update is then may be an update to increase focus on the given presentation page during the current presentation.

Conclusion

FIGS. 1 and 2 are example screen views that might be used by an audience member to interact with a presentation page. The depicted screen view layout is one of many possible layouts that fall within the embodiments described herein. FIGS. 3-6 aid in depicting the architecture, functionality, and operation of various embodiments. In particular, FIGS. 3-6 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Embodiments can be realized in any memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagram of FIG. 7 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A memory resource storing instructions that when executed cause a processing resource to implement a system for managing a presentation, the instructions comprising:
    a page module to maintain metadata for a current presentation, the metadata for the current presentation identifying audience member interactions indicative of audience engagement with the current presentation;
    an action module to process the metadata for the current presentation, wherein to process the metadata for the current presentation, the action module is further to:
        identify a first audience member interaction for the current presentation that is indicative of a comment or a question; and
        identify a level of audience engagement during the current presentation based on the first audience member interaction for the current presentation and a second audience member interaction for the current presentation; and
        identify, based on the level of audience engagement during the current presentation, an action plan that specifies a modification to the current presentation, the modification including a modified set of speaker notes for use in delivering the current presentation, wherein the action plan is identified from a library of action plans including a plurality of action plans; and
    an update module to apply the action plan to provide the modification to the current presentation.

2. The memory resource of claim 1, wherein:
the metadata for the current presentation identifies a number of times each presentation page of a plurality of presentation pages has been interacted with; and
the action module identifies a first of the plurality of presentation pages that has been interacted with more than a second of the plurality of presentation pages to determine the modification to the current presentation, wherein the modification to the current presentation increases a focus on the first of the plurality of presentation pages over the second of the plurality of presentation pages.

3. The memory resource of claim 1, wherein:
the metadata for the current presentation identifies at least one of a role and a location of audience members that interacted with each of a plurality of presentation pages during a previous presentation; and
the action module identifies, with respect to a given audience member role or location, an interest in a first of the plurality of presentation pages over a second of the plurality of presentation pages, and identifies a future audience having a primary audience member role or location matching the given audience member role or location, to determine the modification to the current presentation, wherein the modification to the current presentation increases a focus on the first of the plurality of presentation pages over the second of the plurality of presentation pages.

4. The memory resource of claim 3, wherein:
the level of audience engagement during the current presentation is indicative of a shared audience member question with respect to a given one of a plurality of presentation pages; and
the modification to the current presentation is a modification to increase focus on the given one of the plurality of presentation pages.

5. The memory resource of claim 1, wherein the update module is to generate a notification to a presenter relating to the modification to the current presentation.

6. The memory resource of claim 1, wherein the metadata for the current presentation is associated with each of a plurality of presentation pages and includes an average user rating for each of the plurality of presentation pages, and the modification to the current presentation is based on the average user rating for each of the plurality of presentation pages.

7. The memory resource of claim 1, wherein the metadata for the current presentation is stored as a table entry.

8. A system for managing a presentation comprising:
a computer device, having:
 a processor; and
 a non-transitory storage medium storing machine readable instructions executable by the processor to:
maintain metadata for a current presentation, the metadata for the current presentation identifying audience member interactions indicative of audience engagement with the current presentation;
identify a first audience member interaction for the current presentation based on the metadata for the current presentation, wherein the first audience member interaction includes a comment or a question regarding the current presentation;
identify a level of audience engagement during the current presentation based on the first audience member interaction for the current presentation and a second audience member interaction for the current presentation; and
generate, based on the level of audience engagement with the current presentation, an action plan that specifies a modification to the current presentation, the modification including a modified set of speaker notes for use in delivering the current presentation, wherein the action plan is identified from a library of action plans including a plurality of action plans; and
implement the action plan, wherein the implementing includes modifying the current presentation according to the modification to the current presentation.

9. The system of claim 8, wherein the instructions are further executable to:
recognize download requests for a plurality of presentation pages of the current presentation and maintain the metadata for the current presentation such that it is indicative of a number of download requests for each of the plurality of presentation pages;
identify a first of the plurality of presentation pages that has been requested more than a second of the plurality of presentation pages; and
determine the modification to the current presentation, wherein the modification to the current presentation specifies an update that increases focus on the first of the plurality of presentation pages over the second of the plurality of presentation pages.

10. The system of claim 8, wherein the instructions are further executable to:
maintain, for each of a plurality of presentation pages of the current presentation, metadata indicative of a characteristic of each audience member that interacted with each of the plurality of presentation pages;
analyze the metadata to identify a preference for a first presentation page of the plurality of presentation pages over a second presentation page of the plurality of presentation pages for a given characteristic based on a level of interaction with the first presentation page and the second presentation page by audience members having the given characteristic;
determine the modification to the current presentation based on the identified preference; and
implement the action plan to update the current presentation when the current presentation is to be directed to an audience of members primarily sharing the given characteristic.

11. The system of claim 10, wherein the given characteristic is at least one of a role and a location.

12. The system of claim 8, wherein the instructions are executable to generate a notification to a presenter relating to the modification to the current presentation.

13. The system of claim 8, wherein the metadata for the current presentation is associated with each of a plurality of presentation pages of the current presentation and includes an average user rating for each of the plurality of presentation pages, and the modification to the current presentation is based on the average user rating for each of the plurality of presentation pages.

14. The system of claim 8, wherein the metadata for the current presentation is stored as a table entry.

15. A method for managing a presentation, comprising:
identifying audience member interactions with a plurality of presentation pages of the presentation, wherein the audience member interactions comprises a first audience member interaction including a comment or a question from a first audience member;
identifying a level of audience engagement during the presentation based on a plurality of the audience member interactions including the first audience member interaction and a second audience member interaction;

generating, based on the level of audience engagement during the presentation, an action plan that specifies a modification to the presentation, the modification including a modified set of speaker notes for use in delivering the current presentation, wherein the action plan is identified from a library of action plans including a plurality of action plans; and implementing the action plan to update the presentation according to the modification to the presentation.

16. The method of claim 15, wherein the audience member interactions comprise download requests for the plurality of presentation pages, and the method comprises:

identifying one of the plurality of presentation pages that has been requested more than others of the plurality of presentation pages; and generating an action plan comprising determining the modification to the presentation, wherein the modification to the presentation specifies an update to the presentation that will increase focus on the identified one of the plurality of presentation pages.

17. The method of claim 15, comprising:

for each of the plurality of presentation pages, associating each presentation page with data indicative of a characteristic of each audience member that interacted with the presentation page;

identifying one of the plurality of presentation pages based on a preference of audience members sharing a given characteristic;

generating an action plan comprising determining the modification to the presentation, wherein the modification to the presentation is based on the preference; and updating the presentation when the presentation is to be directed to an audience members primarily sharing the given characteristic.

18. The method of claim 15, wherein:

the level of audience engagement is indicative of a shared audience member question with respect to a given one of the plurality of presentation pages; and the modification to the presentation is to increase focus on the given one of the plurality of presentation pages during the presentation.

19. The method of claim 15, comprising:

generating a notification to a presenter relating to the modification to the presentation.

20. The method of claim 15, comprising:

determining an average user rating for each of the plurality of presentation pages, and wherein the modification to the presentation is based on the average user rating for each of the plurality of presentation pages.

* * * * *